US009638991B2

(12) United States Patent
Wang

(10) Patent No.: US 9,638,991 B2
(45) Date of Patent: May 2, 2017

(54) PROJECTION DEVICE CAPABLE OF COLLECTING LIGHT DENSELY

(71) Applicants: QISDA OPTRONICS (SUZHOU) CO., LTD., Suzhou, Jiangsu Province (CN); QISDA CORPORATION, Taoyuan (TW)

(72) Inventor: Kai-Jing Wang, Tainan (TW)

(73) Assignees: Qisda Optronics (Suzhou) Co., Ltd., Suzhou (CN); Qisda Corporation, Taoyuan (TW)

( * ) Notice: Subject to any disclaimer, the term of this patent is extended or adjusted under 35 U.S.C. 154(b) by 14 days.

(21) Appl. No.: 14/919,752

(22) Filed: Oct. 22, 2015

(65) Prior Publication Data

US 2016/0116832 A1 Apr. 28, 2016

(30) Foreign Application Priority Data

Oct. 24, 2014 (TW) ............................ 103136842 A

(51) Int. Cl.

| | |
|---|---|
| ***G03B 21/20*** | (2006.01) |
| ***G02B 27/14*** | (2006.01) |
| ***G02B 27/28*** | (2006.01) |
| ***F21V 13/02*** | (2006.01) |
| ***F21V 9/14*** | (2006.01) |
| ***G02B 27/10*** | (2006.01) |

(52) U.S. Cl.

CPC ............ *G03B 21/2073* (2013.01); *F21V 9/14* (2013.01); *F21V 13/02* (2013.01); *G02B 27/1006* (2013.01); *G02B 27/283* (2013.01); *G03B 21/2013* (2013.01); *G03B 21/2033* (2013.01); *G03B 21/2066* (2013.01); *G02B 27/141* (2013.01)

(58) Field of Classification Search

CPC . F21V 9/14; F21V 9/08; F21V 14/023; G03B 21/2013; G03B 21/2046; G03B 21/2066

USPC ............. 362/19, 227, 230, 234, 247; 353/20

See application file for complete search history.

(56) References Cited

U.S. PATENT DOCUMENTS 8,690,343 B2 4/2014 Tanaka
2007/0165185 A1* 7/2007 Chen .................. G03B 21/2073 353/20

(Continued)

FOREIGN PATENT DOCUMENTS

CN 103747221 A 4/2014
CN 104040425 A 9/2014

*Primary Examiner* — William C Dowling

(57) ABSTRACT

A projection device includes a light source module and a light splitter module. The light source module includes a first light source, a second light source, a reflection module and a polarizing module. The first light source emits a first light beam with a first polarization direction. The second light source emits a second light beam with a second polarization direction. The reflection module is disposed corresponding to the first light source along the first axis, and is used to reflect the first light beam to a second axis. The polarization module is disposed corresponding to the second light source along the first axis and corresponding to the reflection module along the second axis. The polarization module is used to direct the first light beam to pass through the polarization module along the second axis and reflect the second light beam to the second axis through the light splitter module.

14 Claims, 7 Drawing Sheets

(56) References Cited

U.S. PATENT DOCUMENTS

| | | | | |
|---|---|---|---|---|
| 2009/0122272 | A1* | 5/2009 | Silverstein | G02B 27/0905 353/81 |
| 2014/0354956 | A1* | 12/2014 | Yamada | H04N 9/3152 353/20 |
| 2015/0185598 | A1* | 7/2015 | Wang | G03B 21/2033 353/20 |

* cited by examiner

PROJECTION DEVICE CAPABLE OF COLLECTING LIGHT DENSELY

BACKGROUND OF THE INVENTION

1. Field of the Invention

This invention is related to a projection device, and more particularly, a projection device capable of collecting light densely in a limited space.

2. Description of the Prior Art

To make a projection device suitable for all kinds of applications, users usually have some requirements for the strength of light projected by the projection device. For example, if the environment is rather bright, the image projected by the projection devices with a weaker light source may be easily affected by the environmental lighting, which can cause the loss of image quality. In an environment where the distance between the projection screen and the projection device is rather long, the image projected by the projection device with a weaker light source may be decayed along the distance, which can also cause the loss of image quality. Therefore, how to effectively collect more light into the light splitter system of the projection device in a limited space to improve the strength of light of the image has become a critical issue to be solved.

FIG. 1 shows a projection device 100 according to U.S. Pat. No. 8,690,343. The projection device 100 includes a plurality of first sets of light sources 1101, 1102 and 1103, a plurality of second sets of light sources 1201, 1202, and 1203, a plurality of optical modules 1301, 1302, and 1303, and a light splitter module 140. The optical modules 1301, 1302, and 1303 are disposed along the first axis Y and the second axis Z and parallel to each other. Each of the optical modules 1301, 1302, and 1303 includes a first reflection mirror 132 and a transparent reflection module 134. The first reflection mirror 132 and the transparent reflection module 134 are disposed along the second axis Z and adjacent to each other. The transparent reflection module 134 includes second reflection mirrors 1341 and transparent glasses 1342, where the second reflection mirrors 1341 and the transparent glasses 1342 are disposed with an interleaving manner along the third axis X.

The first set of light sources 1101 is disposed corresponding to the first reflection mirror 132 of the optical module 1301 along the first axis Y, and has the same X coordinate of the third axis X as does the transparent glass 1342 of the transparent reflection module 134. Therefore, the light L1 emitted from the first set of light sources 1101 can be reflected by the first reflection mirror 132 to pass through the transparent glass 1342 of the transparent reflection module 134, and further into the light splitter module 140 after passing through the transparent glass 1342. The second set of light sources 1201 is disposed corresponding to the transparent reflection module 134 of the optical module 1301 along the first axis Y, and has the same X coordinate of the third axis X as does the second reflection mirror 1341 of the transparent reflection module 134. Therefore, the light L2 emitted by the second set of light sources 1201 can be reflected by second reflection mirror 1342 of the transparent reflection module 134 into the light splitter module 140.

The first sets of light sources 1101, 1102, and 1103 are disposed along the second axis Z, the second sets of light sources 1201, 1202, and 1203 are disposed along the second axis Z, and the optical modules 1301, 1302, and 1303 are disposed along the first axis Y and the second axis Z. Therefore the light L1 emitted by the first sets of light sources 1101, 1102, and 1103 can all be directed to the light splitter module 140 by the optical modules 1301, 1302, and 1303 respectively, and the light L2 emitted by the second sets of light sources 1201, 1202, and 1203 can all be directed to the light splitter module 140 by the optical modules 1301, 1302, and 1303 respectively.

Although the projection device proposed by U.S. Pat. No. 8,690,343 can collect more light into the light splitter module 140 in a limited space, when disposing the first sets of light sources and the second sets of light sources, the position along the third axis X must be considered, that is, the first sets of light sources and the second sets of light sources must be disposed corresponding to the second reflection mirror and the transparent glass of the transparent reflection module respectively, which can increase the complexity for implementation. Especially in such a limited space within the projection device, this kind of detail arrangement can be even more difficult, which may cause difficulty in improving the yield rate.

SUMMARY OF THE INVENTION

One embodiment of the present invention discloses a projection device. The projection device comprises a light splitter module and a light source module. The light splitter module is configured to receive and split light beams into a plurality of display color lights. The light source module comprises a first light source, a second light source, a first reflection module, and first polarizing module. The first light source is configured to emit a first light beam with a first polarization direction. The second light source is configured to emit a second light beam with a second polarization direction, and the first light source and the second light source are disposed along a first axis. The first polarization direction is perpendicular to the second polarization direction. The first reflection module comprises at least one reflection mirror. The first reflection module is disposed corresponding to the first light source along the first axis. The first reflection module is configured to reflect the first light beam to a second axis. The first axis is perpendicular to the second axis. The first polarization module comprises at least one polarizer, and the first polarization module is disposed corresponding to the second light source along the first axis and corresponding to the first reflection module along the second axis. The first polarization module is configured to direct the first light beam to pass through the first polarization module along the second axis and reflect the second light beam to the second axis and further into the light splitter module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
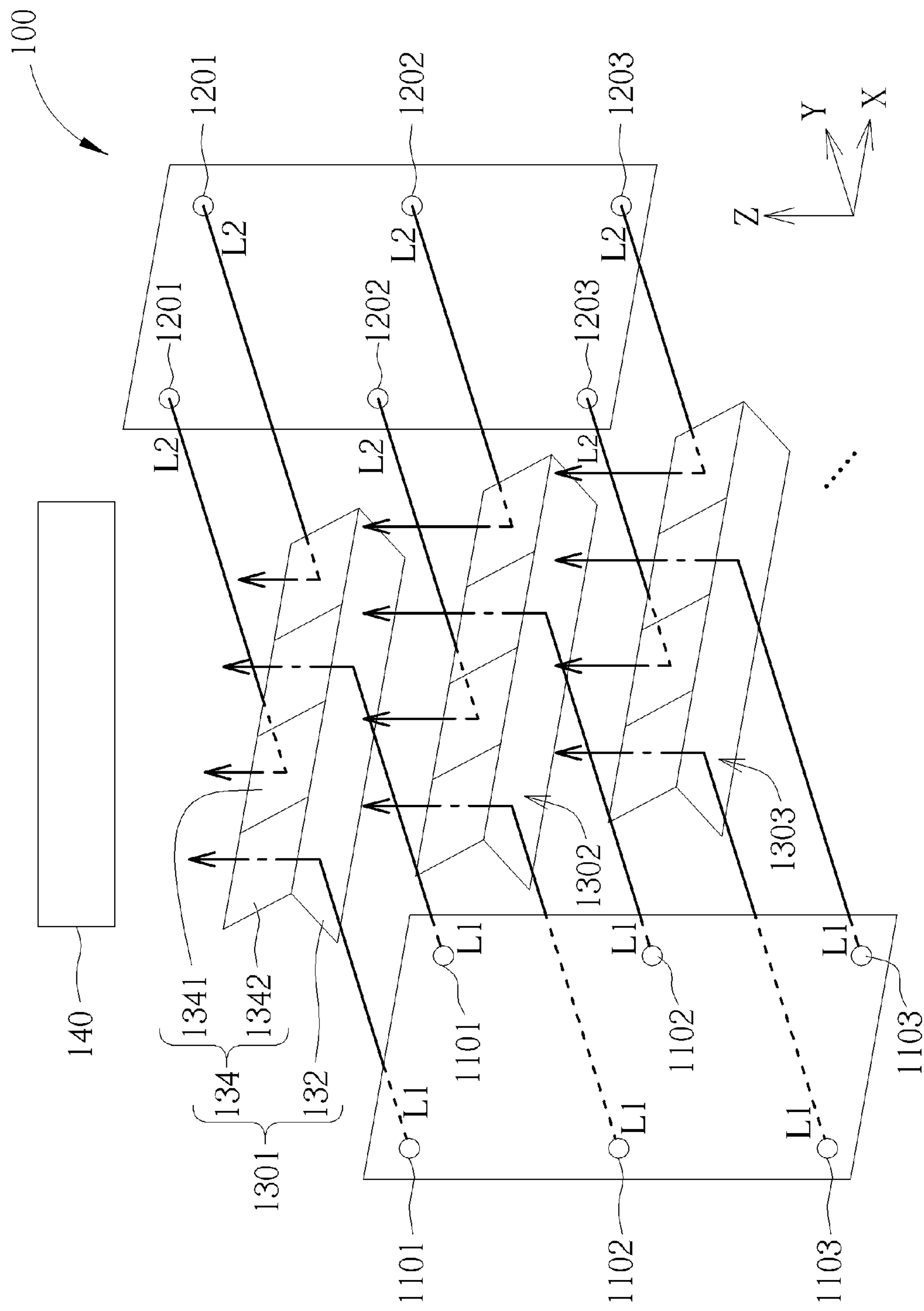
FIG. 1 shows a projection device according to prior art.
Figure 2:
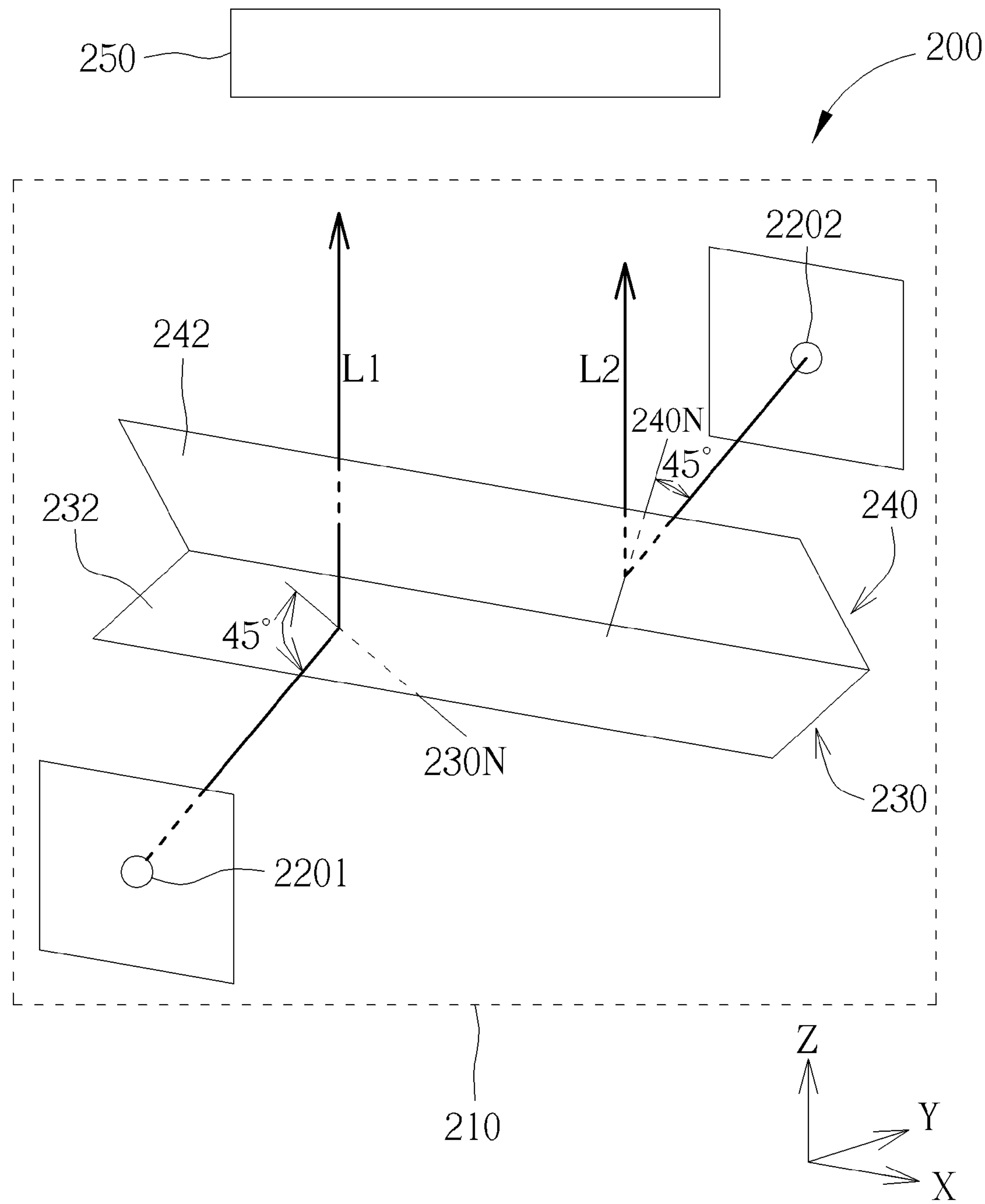
FIG. 2 shows a projection device according to one embodiment of the present invention.

FIG. 2 shows a projection device 200 according to one embodiment of the present invention. The projection device 200 includes a light source module 210 and a light splitter module 250. The light source module 210 includes a first light source 2201, a second light source 2202, a first reflection module 230, and a first polarization module 240. The first axis Y, the second axis Z, and the third axis X are perpendicular to each other.

The first light source 2201 can be used to emit a first light beam L1 with a first polarization direction, the second light source 2202 can be used to emit a second light beam L2 with a second polarization direction. In some embodiments of the present invention, the first light beam L1 and the second light beam L2 can be blue light beams, and the first light source 2201 and the second light source 2202 can be laser light sources.

The first light source 2201 and the second light source 2202 can be disposed along the first axis Y. Also, the first light source 2201 and the second light source 2202 can be disposed respectively in different sides of the first reflection module 230 and the first polarization module 240. Furthermore, the first polarization direction is perpendicular to the second polarization direction. In some embodiments of the present invention, the first polarization direction can be P polarization direction or S polarization direction.

The first reflection module 230 can include the reflection mirror 232. The first reflection module 230 can be disposed corresponding to the first light source 2201 along the first axis Y, and used to reflect the first light beam L1 to the second axis Z. The first polarization module 240 can include a polarizer 242. The first polarization module 240 can be disposed corresponding to the second light source 2202 along the first axis Y and corresponding to the first reflection module 230 along the second axis Z. In some embodiments of the present invention, the polarizer 242 can allow light beams with the first polarization direction to pass through and reflect light beams with the second polarization direction. Therefore, the first polarization module 240 can be used to direct the first light beam L1 reflected from the first reflection module 230 to pass through the first polarization module 240 along the second axis Z, and reflect the second light beam L2 to the second axis Z. The light splitter module 250 can further be used to receive the light beams L1 and L2 along the second axis Z, and split the light beams L1 and L2 into a plurality of display color lights.

In some embodiments of the present invention, an angle between a normal 230N of the first reflection module 230 and the first axis Y is 45 degrees, and an angle between a normal 240N of the first polarization module 240 and the first axis Y is 45 degrees. However, the aforesaid embodiments are not to limit the present invention. In other embodiments of the present invention, as long as the first reflection module 230 and the first polarization module 240 can direct the first light beam L1 and the second light beam L2 into the light splitter module 250, the angel between the normal 230N of the first reflection module 230 and the first axis Y can be other degrees and the angel between the normal 240N of the first polarization module 240 and the first axis Y can also be other degrees.

According to the projection device 200, more light can be directed to the light splitter module 250 in a limited space, and the first light source 2201 and the second light source 2202 can be disposed corresponding to the first reflection module 230 and the first polarization module 240 without considering the X coordinates of the first light source 2201 and the second light source 2202 on the third axis X so that the design can be more simplified and flexible.

In addition, although the projection device 200 includes the first light source 2201 and the second light source 2202, however, this is not to limit the present invention. In some embodiments of the present invention, other numbers of light sources can be added along the third axis X corresponding to the first light source 2201, and the added light sources can be disposed corresponding to the first reflection module 230, or other numbers of light sources can be added along the third axis X corresponding to the second light source 2202, and the added light source can be disposed corresponding to the first polarization module 240 so that more light beams emitted by the added light sources can be directed into the light splitter system, improving the strength of light the projection device can project.

Figure 3:
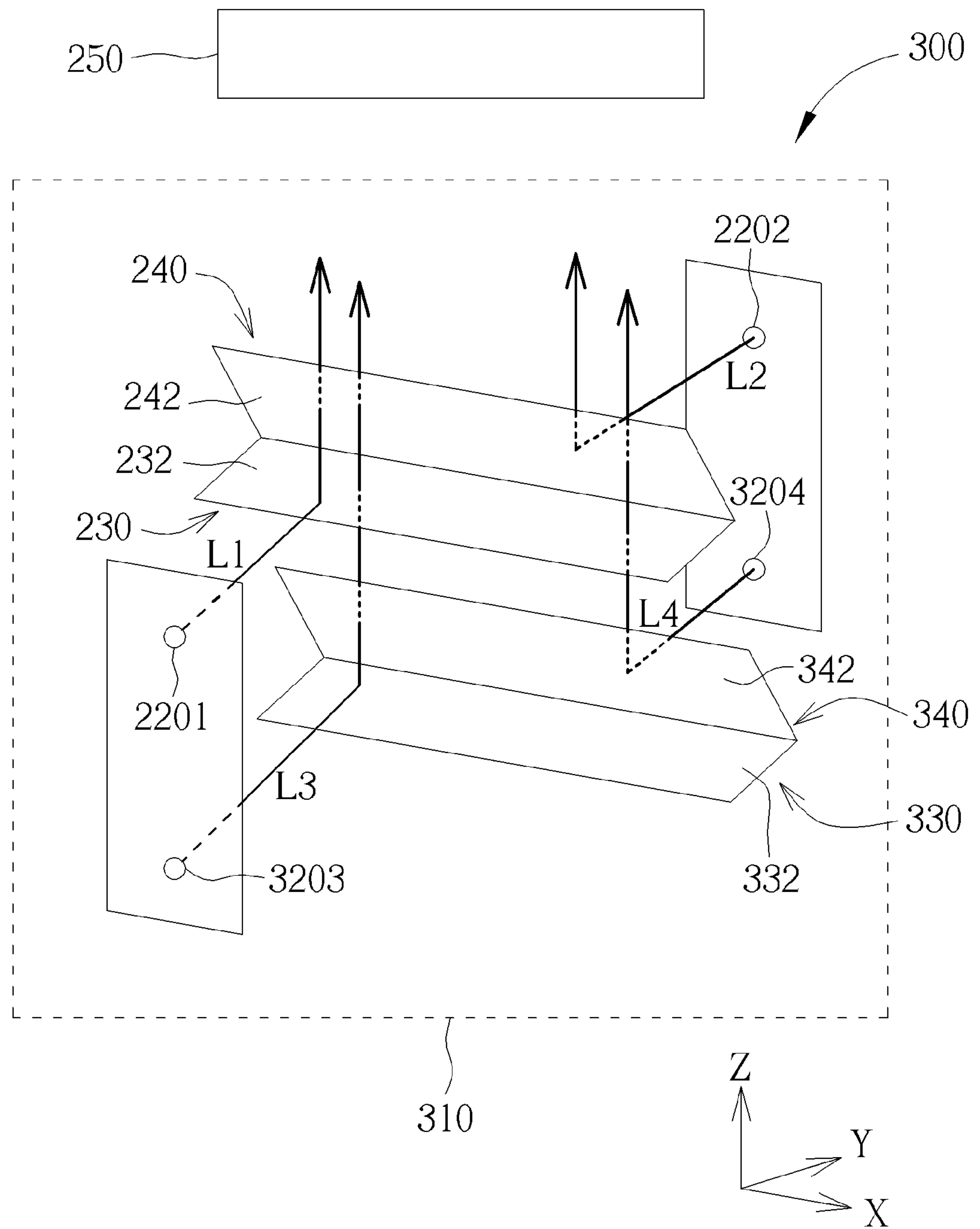
FIG. 3 shows a projection device according to another embodiment of the present invention.

FIG. 3 shows a projection device 300 according to one embodiment of the present invention. The projection device 300 includes a light source module 310 and a light splitter module 250. The light source module 310 includes the first light source 2201, the second light source 2202, the third light source 3203, the fourth light source 3204, the first reflection module 230, the first polarization module 240, the second reflection module 330, and the second polarization module 340.

The common components (the first light source 2201, the second light source 2202, the first reflection module 230, and the first polarization module 240) of the projection devices 200 and 300 can be operated with the same principles, so the redundant explanation is saved.

The third light source 3203 can be used to emit a third light beam L3 with the first polarization direction, and the third light beam L3 is parallel to the first light beam L1. The fourth light source 3204 can be used to emit a fourth light beam L4 with the second polarization direction, and the fourth light beam L4 is parallel to the second light beam L2.

In some embodiments of the present invention, the second reflection module 330 can include a reflection mirror 332, and the second reflection module 330 can share the same operation principles as the first reflection module 230. Also, the second polarization module 340 can include a polarizer 342, and the second polarization module 340 can share the same operation principles as the first polarization module 240. In addition, the second reflection module 330 can be disposed parallel to the first reflection module 230 and corresponding to the third light source 3203. In some embodiments of the present invention, the second reflection module 330 can be disposed in parallel with the first reflection module 230 along the first axis Y and the second axis Z, and the second reflection module 330 and the first reflection module 230 are not overlapping with each other along the first axis Y and the second axis Z. The second reflection module 330 can be disposed corresponding to the third light source 3203, and can be used to reflect the third light beam L3 to the second axis Z further into the light splitter module 250. The second polarization module 340 can be disposed in parallel with the first polarization module 240 and corresponding to the fourth light source 3204 and the second reflection module 330. In some embodiments of the present invention, the second polarization module 340 can be disposed adjacent to the second reflection module 330 along the second axis Z. The polarizer 342 of the second polarization module 340 can allow light beams with the first polarization direction to pass through and reflect light beams with the second polarization direction. Therefore, the second polarization module 340 can be used to direct the third light beam L3 reflected by the second reflection module 330 to pass through the second polarization module 340 along the second axis Z and reflect the fourth light beam L4 to the second axis Z and further into the light splitter module 250.

By means of the second reflection module 330 and the second polarization module 340, the projection device 300 can collect even more light beams from other light sources into the light splitter module 250. Although the projection device 300 includes the first light source 2201, the second light source 2202, the third light source 3203 and the fourth light source 3204, this is not to limit the present invention. In other embodiments of the present invention, other numbers of light sources can be added along the third axis X and/or the second axis Y, and the corresponding reflection modules and polarization modules can be added, so that even more light beams emitted from the light sources can be directed into the light splitter module.

Figure 4:
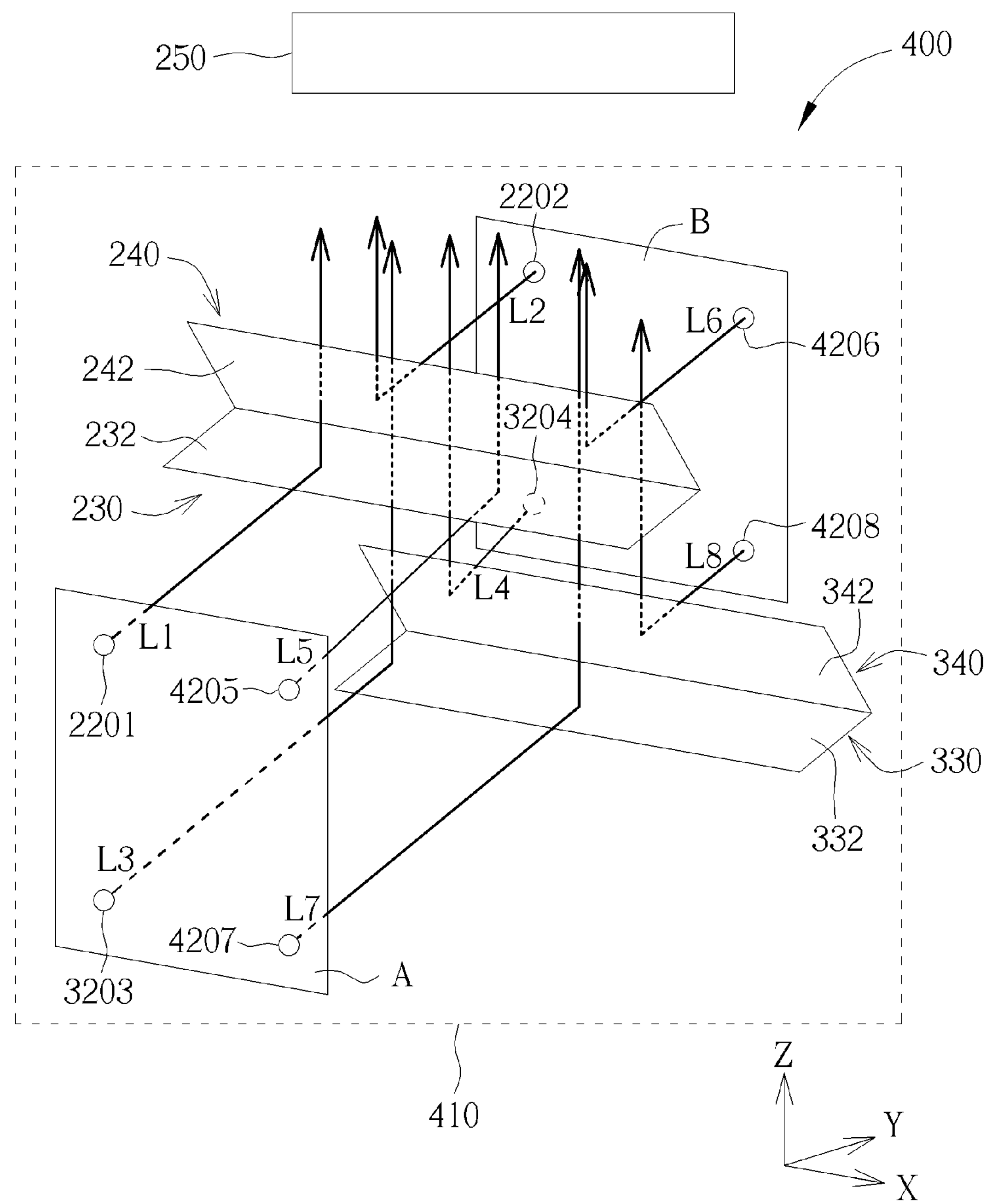
FIG. 4 shows a projection device according to another embodiment of the present invention.

FIG. 4 shows a projection device 400 according to one embodiment of the present invention. The projection device 400 includes the light source module 410 and the light splitter module 250. The light source module 410 includes the first light source 2201, the second light source 2202, the third light source 3203, the fourth light source 3204, the fifth light source 4205, the sixth light source 4206, the seventh light source 4207, the eighth light source 4208, the first reflection module 230, the first polarization module 240, the second reflection module 330, and the second polarization module 340.

The common components (the first light source 2201, the second light source 2202, the third light source 3203, the fourth light source 3204, the first reflection module 230, the first polarization module 240, the second reflection module 330, and the second polarization module 340) in the projection devices 300 and 400 can be operated with the same principles.

The fifth light source 4205 can be used to emit a fifth light beam L5 with the first polarization direction, and the fifth light beam L5 is parallel to the first light beam L1. The sixth light source 4206 can be used to emit a sixth light beam L6 with the second polarization direction, and the sixth light beam L6 is parallel to the second light beam L2. The seventh light source 4207 can be used to emit a seventh light beam L7 with the first polarization direction, and the seventh light beam L7 is parallel to the first light beam L1. The eighth light source 4208 can be used to emit an eighth light beam L8 with the second polarization direction, and the eighth light beam L8 is parallel to the second light beam L2.

In some embodiments of the present invention, the fifth light source 4205 and the first light source 2201 can be disposed along the third axis X. The sixth light source 4206 and the second light source 2202 can be disposed along the third axis X. Therefore, the fifth light beam L5 can be reflected by the first reflection module 230 to pass through the first polarization module 240 along the second axis Z and into the light splitter module 250. The sixth light beam L6 can be reflected by the first polarization module 240 into the light splitter module 250 along the second axis Z. The seventh light source 4207 and the third light source 3203 can be disposed along the third axis X. The eighth light source 4208 and the fourth light source 3204 can be disposed along the third axis X. Therefore, the seventh light beam L7 can be reflected by the second reflection module 330 to pass through the second polarization module 340 along the second axis Z and into the light splitter module 250, and the eighth light beam L8 can be reflected by the second polarization module 340 to the second axis Z and into the light splitter module 250.

Although in FIG. 4, the projection device 400 only includes the first light source 2201, the second light source 2202, the third light source 3203, the fourth light source 3204, the fifth light source 4205, the sixth light source 4206, the seventh light source 4207, the eighth light source 4208, this is not to limit the present invention. According to the aforesaid embodiments of the present invention, one of ordinary skill in the art can expand more light sources from the first light source 2201 and/or from the second light source 2202 along the third axis X and/or the second axis Z according to the system needs. These simple modifications should also belong to scope of the present invention. According to the projection device 400, more light can be directed to the light splitter module 250 in a limited space, and the arrangement of the light sources can be free from strict considerations of the X coordinates of the light sources so that the design can be more simplified and flexible.

Furthermore, in some embodiments of the present invention, the first light source 2201, the third light source 3203, the fifth light source 4205, and the seventh light source 4207 can form a first light module A, and the second light source 2202, the fourth light source 3204, the sixth light source 4206, and the eighth light source 4208 can form a second light module B. Since the only difference between the first light module A and the second light module B is that the polarization directions of the light beams emitted by these two are perpendicular, if the first light module A in FIG. 4 is rotated by the first axis Y by 90 degrees, it will have the exactly same function as the second light module B. Therefore, when manufacturing the projection device in a real case, only the light modules with the same polarization direction are needed. After rotating some of the light modules for 90 degrees, light modules with two perpendicular polarization directions are generated, which can further simplify the manufacturing process.

Figure 5:
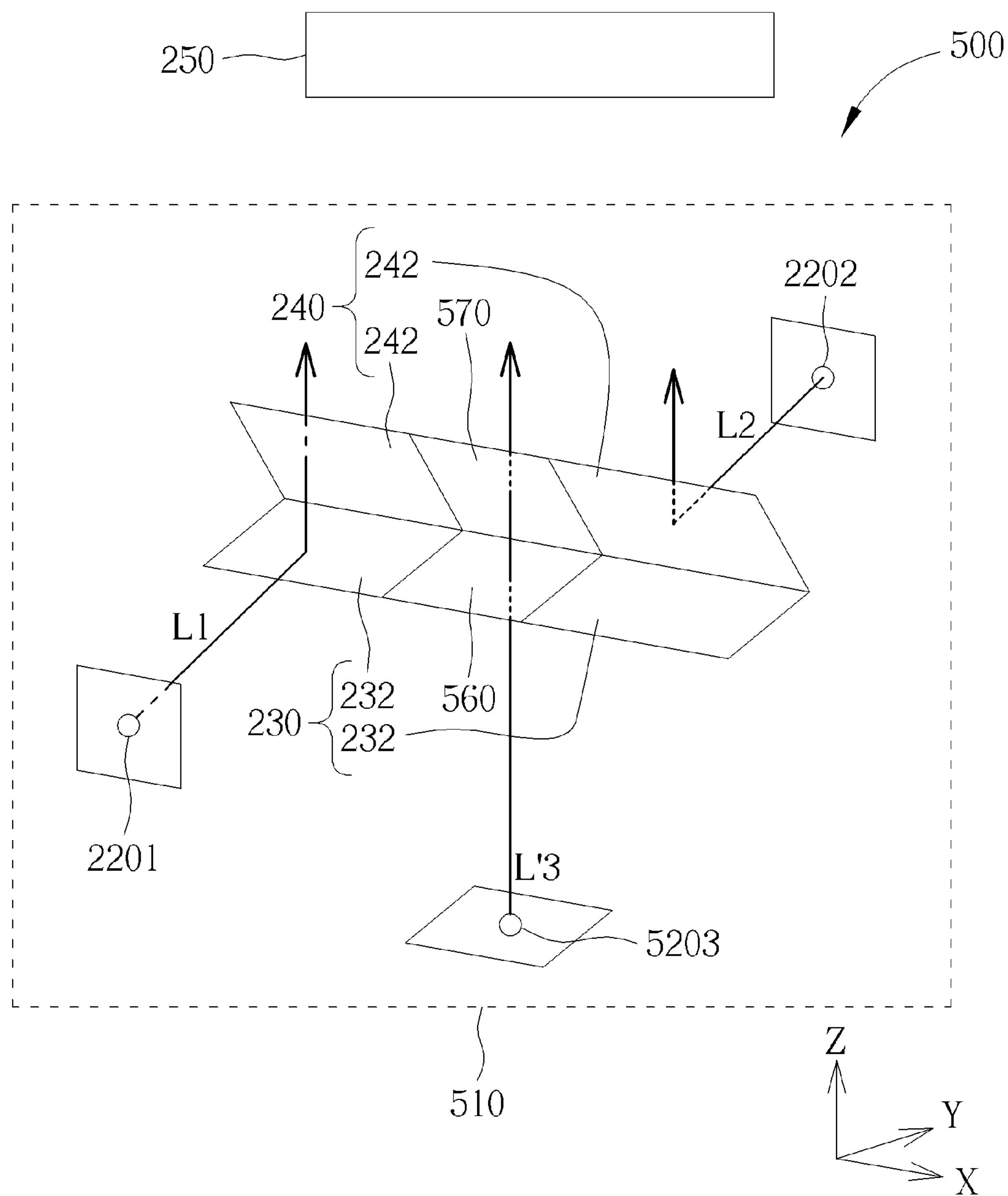
FIG. 5 shows a projection device according to another embodiment of the present invention.

FIG. 5 shows a projection device 500 according to one embodiment of the present invention. The projection device 500 includes a light source module 510 and a light splitter module 250. The light source module 510 includes a first light source 2201, a second light source 2202, a third light source 5203, a first reflection module 230, a first polarization module 240, a first transmissive piece 560 and a second transmissive piece 570.

The common components (the first light source 2201, the second light source 2202, the first reflection module 230, and the first polarization module 240) in the projection devices 200 and 500 can be operated with the same principles, so the redundant explanation is saved.

The third light source 5203 can be used to emit a third light beam L'3 along the second axis Z. In some embodiments of the present invention, the first transmissive piece 560 can be disposed corresponding to the third light source 5203 along the second axis Z and the first transmissive piece 560 can be disposed adjacent to the two reflection mirrors 232 of the first reflection module 230 along the third axis X. The first transmissive piece 560 can be used to direct the third light beam L'3 to pass through the first transmissive piece 560 along the second axis Z. The second transmissive piece 570 can be disposed corresponding to the first transmissive piece 560 along the second axis Z and adjacent to the two polarizers 242 of the first polarization module 240, and the second transmissive piece 570 can be used to direct the third light beam L'3 coming from the first transmissive piece 560 to pass through the second transmissive piece 570 along the second axis Z into the light splitter module 250.

In some embodiments of the present invention, the first transmissive piece 560 and the second transmissive piece 570 can be non-reflective transparent glasses so that the third light beam L'3 can pass through the first transmissive piece 560 and the second transmissive piece 570. However, this is not to limit the present invention. In other embodiments of the present invention, the third light beam L'3 can have the first polarization direction, the first transmissive piece 560 can be non-reflective transparent glass, and the second transmissive piece 570 can use the same material as the polarizer 242 of the polarization module 240, which can also help to improve the flexibility of design.

The projection device 500 cannot only use the first reflection module 230 and the first polarization module 240 to direct the first light beam L1 and the second light beam L2 emitted from different sides of the first reflection module 230 and the first polarization module 240 into the light splitter module 250, but can also use the first transmissive piece 560 and the second transmissive piece 570 to direct the third light beam L'3 emitted from a third side of the first reflection module 230 and the first polarization module 240 into the light splitter module 250. Consequently, projection device 500 can collect even more light beams to the light splitter module 250 in a limited space.

Figure 6:
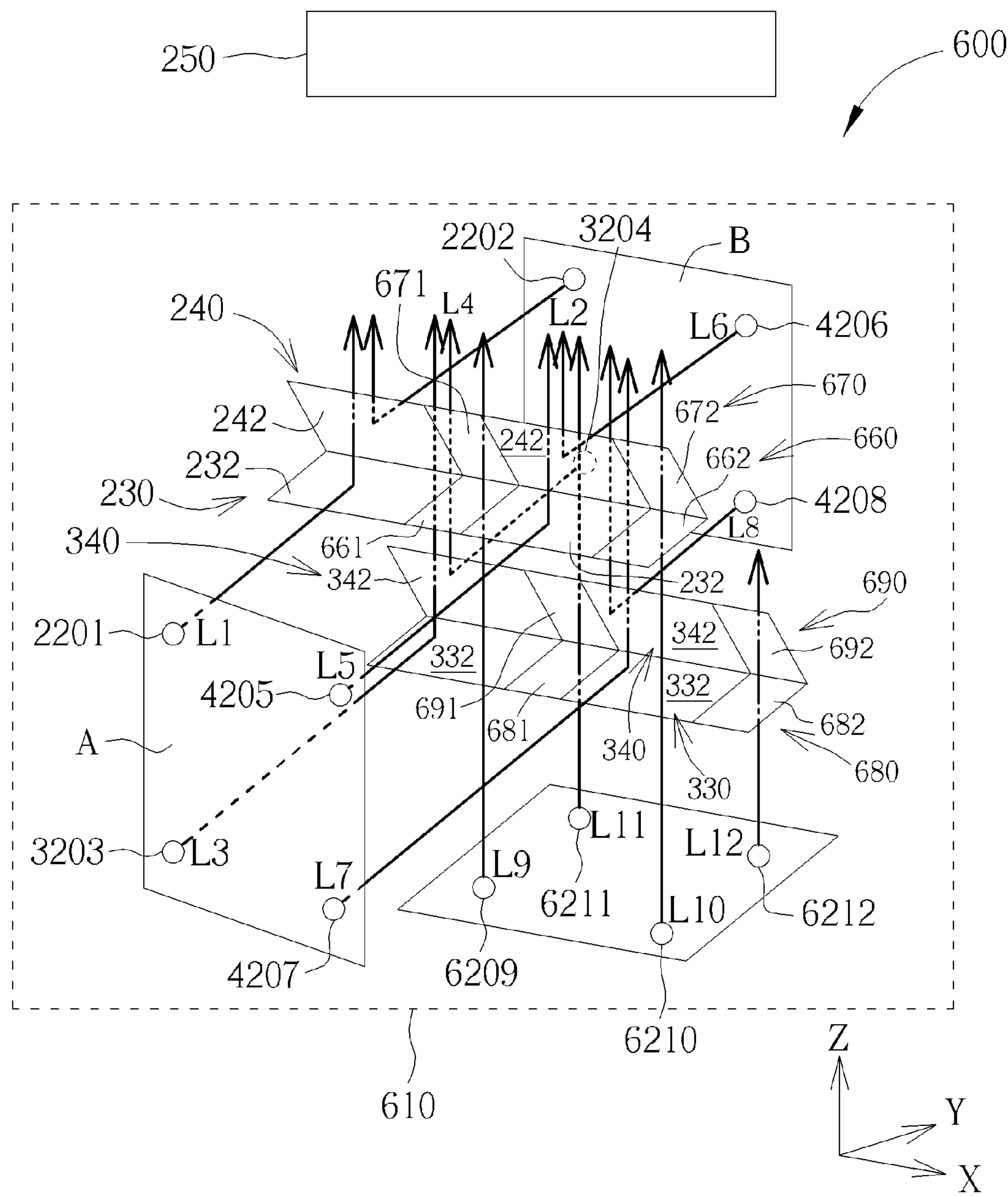
FIG. 6 shows a projection device according to another embodiment of the present invention.

FIG. 6 shows a projection device 600 according to one embodiment of the present invention. The projection device 600 can include the light source module 610 and the light splitter module 250. The light source module 610 can include the first light source 2201, the second light source 2202, the third light source 3203, the fourth light source 3204, the fifth light source 4205, the sixth light source 4206, the seventh light source 4207, the eighth light source 4208, the ninth light source 6209, the tenth light source 6210, the first reflection module 230, the first polarization module 240, the second reflection module 330, the second polarization module 340, the first transmissive module 660, and the second transmissive module 670.

The common components (the first light source 2201, the second light source 2202, the third light source 3203, the fourth light source 3204, the fifth light source 4205, the sixth light source 4206, the seventh light source 4207, the eighth light source 4208, the first reflection module 230, the first polarization module 240, the second reflection module 330, and the second polarization module 340) in the projection device 500 and 600 can be operated with the same principles.

The ninth light source 6209 can be used to emit a ninth light beam L9 parallel to the second axis Z. The tenth light source 6210 can be used to emit a tenth light beam L10 parallel to the second axis Z. The first transmissive module 660 can be disposed corresponding to the ninth light source 6209 and the tenth light source 6210 along the second axis Z. The first transmissive module 660 can include two first transmissive pieces 661 and 662, and the two transmissive pieces 661 and 662 can be disposed interleaving with the two reflection mirrors 232 of the first reflection module 230 along the third axis X. The first transmissive module 660 can be used to direct the ninth light beam L9 and the tenth light beam L10 to pass through the first transmissive module 660 and further into the light splitter module 250 along the second axis Z. The second transmissive module 670 can include two transmissive pieces 671 and 672. The two second transmissive pieces 671 and 672 can be disposed corresponding to the two first transmissive pieces 661 and 662 along the second axis Z and adjacent to the two polarizers 242 of the first polarization module 240. The second transmissive module 670 can be used to direct the ninth light beam L9 and the tenth light beam L10 coming from the first transmissive module 660 to pass through the second transmissive module 670 into the light splitter module 250 along the second axis Z. Namely, the ninth light beam L9 can pass through the first transmissive piece 661 and the second transmissive piece 671 to the light splitter module 250, and the tenth light beam L10 can pass through the first transmissive piece 662 and the second transmissive piece 672 to the light splitter module 250.

In some embodiments of the present invention, the projection device 600 can further include an eleventh light source 6211, the twelfth light source 6212, the third transmissive module 680 and the fourth transmissive module 690. The eleventh light source 6211 can be used to emit an eleventh light beam L11 parallel with the second axis Z, and the twelfth light source 6212 can be used to emit a twelfth light beam L12 parallel with the second axis Z.

The third transmissive module 680 can be disposed corresponding to the eleventh light source 6211 and the twelfth light source 6212 along the second axis Z. The third transmissive module 680 can include two third transmissive pieces 681 and 682, and the two third transmissive pieces 681 and 682 can be disposed interleaving with the two reflection mirrors 332 of the second reflection module 330 along the third axis X. The third transmissive module 680 can be used to direct the eleventh light beam L11 and the twelfth light beam L12 to pass through the third transmissive module 680 and further into the light splitter module 250 along the second axis Z. The fourth transmissive module 690 can include two fourth transmissive pieces 691 and 692. The two fourth transmissive pieces 691 and 692 can be disposed corresponding to the two third transmissive pieces 681 and 682 along the second axis Z and interleaving with the two polarizers 342 of the second polarization module 340 along the third axis X. The fourth transmissive module 690 can be used to direct the eleventh light beam L11 and the twelfth light beam L12 coming from the third transmissive module 680 to pass through the fourth transmissive module 690 into the light splitter module 250 along the second axis Z. Namely, the eleventh light beam L11 can pass through the third transmissive piece 681 and the fourth transmissive piece 691 to the light splitter module 250, and the twelfth light beam L12 can pass through the third transmissive piece 682 and the fourth transmissive piece 692 to the light splitter module 250.

Figure 7:
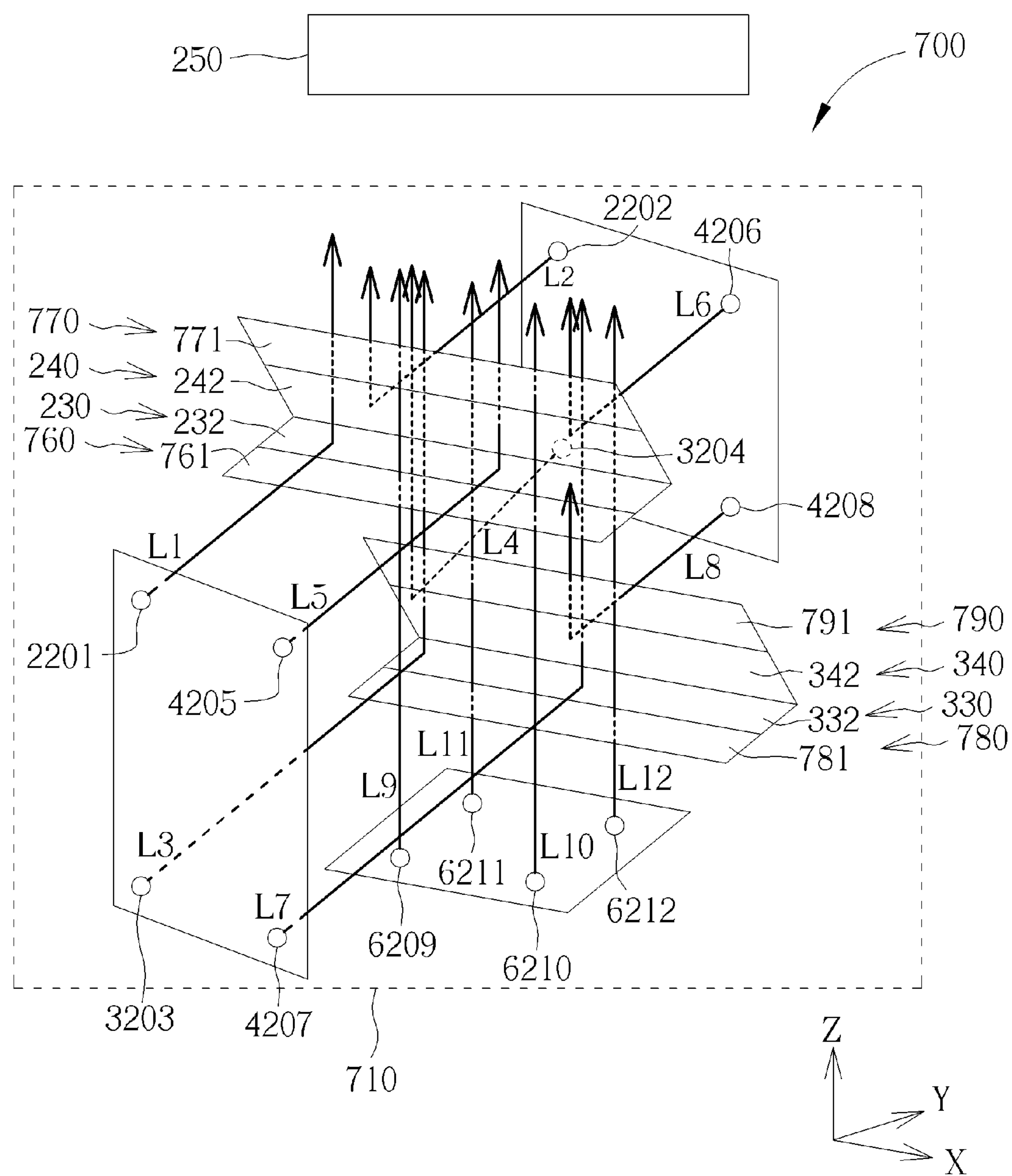
FIG. 7 shows a projection device according to another embodiment of the present invention.

FIG. 7 shows a projection device 700 according to one embodiment of the present invention. The projection device 700 and the projection device 600 have the similar structures, and the differences are in that: the first transmissive module 760 of the projection device 700 includes a first transmissive piece 761 and the first transmissive piece 761 can be disposed adjacent to the reflection mirror 232 of the first reflection module 230 along the second axis Z, the second transmissive module 770 of the projection device 700 includes a second transmissive piece 771 and the second transmissive piece 771 can be disposed corresponding to the first transmissive piece 761 along the second axis Z and adjacent to the polarizer 242 of the first polarization module 240 along the second axis Z, the third transmissive module 780 of the projection device 700 includes a third transmissive piece 781 and the third transmissive piece 781 can be disposed adjacent to the reflection mirror 332 of the second reflection module 330 along the second axis Z, and the fourth transmissive module 790 of the projection device 700 includes a fourth transmissive piece 791 and the fourth transmissive piece 791 can be disposed corresponding to the third transmissive piece 781 along the second axis Z and adjacent to the polarizer 342 of the second polarization module 340 along the second axis Z Consequently, the ninth light beam L9 and the tenth light beam L10 can both pass through the first transmissive piece 761 and the second transmissive piece 771 to the light splitter module 250, and the eleventh light beam L11 and the twelfth light beam L12 can both pass through the third transmissive piece 781 and fourth transmissive piece 791 to the light splitter module 250. The structure of the projection device 700 can even simplify the corresponding relations between the first reflection module 230, the first polarization module 240, the first transmissive module 760, the second transmissive module 770, the second reflection module 330, the second polarization module 340, the third transmissive module 780 and the fourth transmissive module 790, which make the design even more easier. Furthermore, in other embodiments of the present invention, the ninth light beam L9, the tenth light beam L10, the eleventh light beam L11, and the twelfth light beam L12 can all have the first polarization direction so that the second transmissive piece 771 and the fourth transmissive piece 791 can use the same material as the polarizer 234, which makes the design even more flexible.

In summary, according to the projection devices in the embodiments of the present invention, more light beams can be directed into the light splitter system of the projection device in a limited space so that the strength of light of the projection device can be improved and the requirements from the users can also be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection device, comprising:

a light splitter module configured to receive and split light beams into a plurality of display color lights; and a light source module, comprising:

a first light source configured to emit a first light beam with a first polarization direction;

a second light source configured to emit a second light beam with a second polarization direction, wherein the first light source and the second light source are disposed along a first axis and the first polarization direction is perpendicular to the second polarization direction;

a first reflection module comprising at least one reflection mirror, the first reflection module disposed corresponding to the first light source along the first axis, and configured to reflect the first light beam to a second axis, wherein the first axis is perpendicular to the second axis; and a first polarization module comprising at least one polarizer, the first polarization module disposed corresponding to the second light source along the first axis and corresponding to the first reflection module along the second axis, and configured to direct the first light beam to pass through the first polarization module along the second axis and reflect the second light beam to the second axis and further into the light splitter module.

2. The projection device of claim 1, wherein the light source module further comprises:

a third light source configured to emit a third light beam along the second axis;

a first transmissive piece disposed corresponding to the third light source along the second axis and adjacent to the first reflection module along the second axis or a third axis, and configured to direct the third light beam to pass through the first transmissive piece along the second axis; and a second transmissive piece disposed corresponding to the first transmissive piece along the second axis and adjacent to the first polarization module, and configured to direct the third light beam coming from the first transmissive piece to pass through the second transmissive piece along the second axis into the light splitter module;

wherein the third axis is perpendicular to the second axis.

3. The projection device of claim 2, wherein the third light beam has the first polarization direction.

4. The projection device of claim 1, wherein the light source module further comprises:

a third light source configured to emit a third light beam with the first polarization direction, wherein the third light beam is parallel to the first light beam;

a fourth light source configured to emit a fourth light beam with the second polarization direction, wherein the fourth light beam is parallel to the second light beam;

a second reflection module disposed parallel to the first reflection module and corresponding to the third light source, and configured to reflect the third light beam to the second axis further into the light splitter module; and a second polarization module disposed parallel to the first polarization module and corresponding to the fourth light source and the second reflection module, and configured to direct the third light beam to pass through the second polarization module along the second axis and reflect the fourth light beam to the second axis and further into the light splitter module.

5. The projection device of claim 4, wherein the light source module further comprises:

a fifth light source configured to emit a fifth light beam with the first polarization direction, wherein the fifth light beam is parallel to the first light beam; and a sixth light source configured to emit a sixth light beam with the second polarization direction, wherein the sixth light beam is parallel to the second light beam;

wherein the fifth light beam is reflected by the first reflection module to pass through the first polarization module along the second axis into the light splitter module, and the sixth light beam is reflected by the first polarization module into the light splitter module along the second axis.

6. The projection device of claim 5, wherein the light source module further comprises:

a seventh light source configured to emit a seventh light beam with the first polarization direction, wherein the seventh light beam is parallel to the first light beam; and an eighth light source configured to emit an eighth light beam with the second polarization direction, wherein the eighth light beam is parallel to the second light beam;

wherein the seventh light beam is reflected by the second reflection module to pass through the second polarization module along the second axis and into the light splitter module, and the eighth light beam is reflected by the second polarization module into the light splitter module along the second axis.

7. The projection device of claim 6, wherein the first light source, the third light source, the fifth light source, and the seventh light source form a first light module, the second light source, the fourth light source, the sixth light source, and the eighth light source forma second light module, and the second light module is corresponding to the first light module along the first axis with a rotation of 90 degree.

8. The projection device of claim 6, wherein the light source module further comprises:

a ninth light source configured to emit a ninth light beam parallel to the second axis;

a tenth light source configured to emit a tenth light beam parallel to the second axis;

a first transmissive module disposed corresponding to the ninth light source and the tenth light source along the second axis, the first transmissive module comprising at least one first transmissive piece, wherein the at least one transmissive piece is disposed adjacent to the at least one reflection mirror of the first reflection module along the second axis or interleaving with the at least one reflection mirror along a third axis, and the first transmissive module configured to direct the ninth light beam and the tenth light beam to pass through the first transmissive module and further into the light splitter module along the second axis; and a second transmissive module comprising at least one second transmissive piece, the second transmissive piece disposed corresponding to the at least one first transmissive piece along the second axis and adjacent to the at least one polarizer of the first polarization module, the second transmissive module configured to direct the ninth light beam and the tenth light beam coming from the first transmissive module to pass through the second transmissive module into the light splitter module along the second axis;

wherein the third axis is perpendicular to the second axis.

9. The projection device of claim 8, wherein the third light beam and the ninth light beam have the first polarization direction.

10. The projection device of claim 1, wherein the light beams are blue light beams.

11. The projection device of claim 1, wherein the light sources are laser light sources.

12. The projection device of claim 1, wherein an angle between a normal of the first reflection module and the first axis is 45 degrees.

13. The projection device of claim 1, wherein an angle between a normal of the first polarization module and the first axis is 45 degrees.

14. The projection device of claim 1, wherein the first polarization direction is P polarization direction or S polarization direction.

* * * * *